US009152604B2

(12) United States Patent
Hollender et al.

(10) Patent No.: US 9,152,604 B2
(45) Date of Patent: Oct. 6, 2015

(54) SYSTEM AND METHOD FOR EVENT LOGGING IN A TECHNICAL INSTALLATION OR A TECHNICAL PROCESS

(71) Applicant: ABB AG, Mannheim (DE)

(72) Inventors: Martin Hollender, Dossenheim (DE); Mikko Rissanen, Singapore (SG)

(73) Assignee: ABB AG, Mannheim (DE)

( * ) Notice: Subject to any disclaimer, the term of this patent is extended or adjusted under 35 U.S.C. 154(b) by 0 days.

(21) Appl. No.: 14/173,511

(22) Filed: Feb. 5, 2014

(65) Prior Publication Data

US 2014/0218191 A1 Aug. 7, 2014

(30) Foreign Application Priority Data

Feb. 5, 2013 (DE) ........................ 10 2013 001 926

(51) Int. Cl.

| | |
|---|---|
| ***G06F 15/16*** | (2006.01) |
| ***G06F 15/177*** | (2006.01) |
| ***G05B 15/02*** | (2006.01) |
| ***G05B 19/418*** | (2006.01) |
| ***G06F 17/30*** | (2006.01) |

(52) U.S. Cl.

CPC .............. *G06F 15/177* (2013.01); *G05B 15/02* (2013.01); *G05B 19/4183* (2013.01); *G06F 17/30* (2013.01); *H04L 2209/60* (2013.01)

(58) Field of Classification Search

CPC .......................... H04L 2209/60; G06F 15/177

See application file for complete search history.

(56) References Cited

U.S. PATENT DOCUMENTS

| | | | | |
|---|---|---|---|---|
| 6,088,659 | A * | 7/2000 | Kelley et al. | 702/62 |
| 8,321,516 | B2 * | 11/2012 | Sargent et al. | 709/206 |
| 8,805,690 | B1 * | 8/2014 | Lebeau et al. | 704/275 |
| 8,869,036 | B1 * | 10/2014 | Deshpande et al. | 715/736 |
| 8,880,996 | B1 * | 11/2014 | Deshpande et al. | 715/234 |
| 2011/0029582 | A1 | 2/2011 | Schmidt et al. | |
| 2013/0018972 | A1 * | 1/2013 | Sargent et al. | 709/206 |
| 2013/0115972 | A1 * | 5/2013 | Ziskind et al. | 455/456.2 |
| 2014/0075004 | A1 * | 3/2014 | Van Dusen et al. | 709/223 |

FOREIGN PATENT DOCUMENTS

WO WO 2009/112252 A2 9/2009

* cited by examiner

*Primary Examiner* — Van Trieu

(74) *Attorney, Agent, or Firm* — Buchanan Ingersoll & Rooney PC

(57) ABSTRACT

An exemplary logging system and a method are for detecting, conditioning and presenting installation-specific and/or process-specific operator control actions, process reports, alarm reports, system events, installation parameters and digital text messages for a technical installation or a technical process. The logging system having at least one input apparatus that automatically converts audible and/or spoken information and information that is present in written form into digital text messages and provides the information, together with information relating to operator control actions, information relating to navigation steps performed and further text information that is present in digitized form, for a processing unit, that can automatically attribute timestamps.

18 Claims, 3 Drawing Sheets

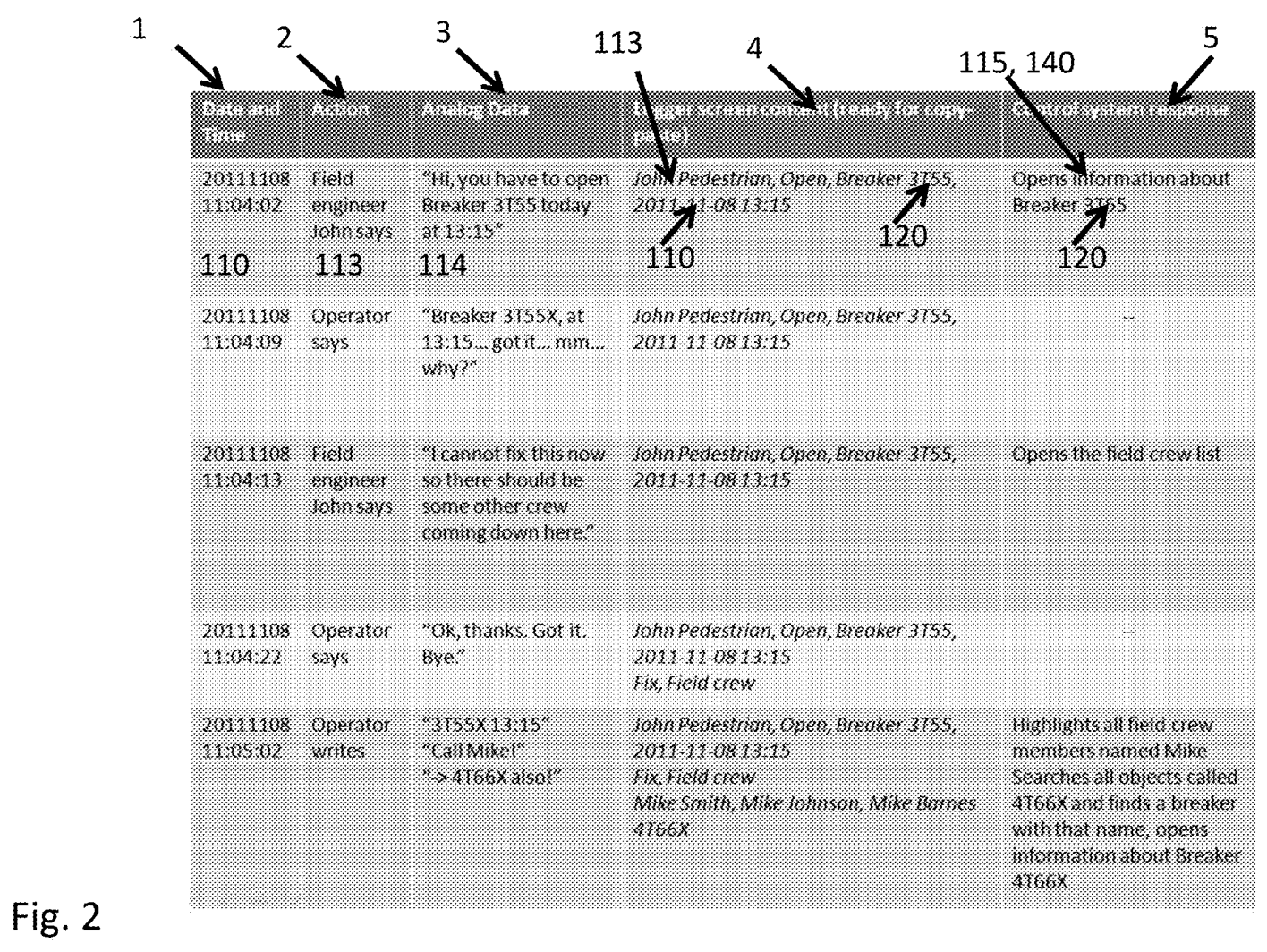

1 2 3 113 4 115, 140 5 110 113 114 110 120 120

| Date and Time | Action | Analog Data | Logger screen content (ready for copy-paste) | Control system response |
|---|---|---|---|---|
| 20111108 11:04:02 | Field engineer John says | "Hi, you have to open Breaker 3T55 today at 13:15" | *John Pedestrian, Open, Breaker 3T55, 2011-11-08 13:15* | Opens information about Breaker 3T55 |
| 20111108 11:04:09 | Operator says | "Breaker 3T55X, at 13:15... got it... mm... why?" | *John Pedestrian, Open, Breaker 3T55, 2011-11-08 13:15* | -- |
| 20111108 11:04:13 | Field engineer John says | "I cannot fix this now so there should be some other crew coming down here." | *John Pedestrian, Open, Breaker 3T55, 2011-11-08 13:15* | Opens the field crew list |
| 20111108 11:04:22 | Operator says | "Ok, thanks. Got it. Bye." | *John Pedestrian, Open, Breaker 3T55, 2011-11-08 13:15 Fix, Field crew* | -- |
| 20111108 11:05:02 | Operator writes | "3T55X 13:15" "Call Mike!" "-> 4T66X also!" | *John Pedestrian, Open, Breaker 3T55, 2011-11-08 13:15 Fix, Field crew Mike Smith, Mike Johnson, Mike Barnes 4T66X* | Highlights all field crew members named Mike Searches all objects called 4T66X and finds a breaker with that name, opens information about Breaker 4T66X |

Fig. 2

SYSTEM AND METHOD FOR EVENT LOGGING IN A TECHNICAL INSTALLATION OR A TECHNICAL PROCESS

RELATED APPLICATION

This application claims priority under 35 U.S.C. §119 to German Patent Application No. 10 2013 001 926.5 filed in Germany on Feb. 5, 2013, the entire content of which is hereby incorporated by reference in its entirety.

FIELD

The present disclosure relates to a logging system for detecting, conditioning and presenting installation-specific and/or process-specific information from alarm and/or event logs, such as operator control actions, process reports, alarm reports, system events, digital text messages (audit logs) and installation parameters, for a technical installation or a technical process that can be integrated in an operating and observation system of the technical installation or of the technical process, and the operating and observation system can be used in a control room or a control installation for a commercial installation, for example an oil and gas platform, a refinery or a power plant installation. In addition, the present disclosure relates to a method for detecting, conditioning and presenting installation-specific and/or process-specific information that is provided for the operating and/or servicing personnel of the installation or of the process.

BACKGROUND

In exemplary commercial installations, a large amount of installation-specific or process-specific information, including operator control actions, process reports, alarm reports, system events, audit logs and installation parameters, is stored as alarm and event logs.

WO 2009/112252 describes a method and a device for storing data that are in each case part of an alarm or event report containing a plurality of attributes, wherein a stipulated table is used to directly store a first portion of the attributes that are part of an alarm or event report in normalized form, and additionally both the first portion and a remaining second portion of the attributes are stored as a provision data record.

Operating and observation systems currently used in commercial installations, such as control systems, also called a digital control system (DCS), log time series data and/or historic process values from process signals and also event data, from process alarms, system events and audit logs, and store these data in appropriate archives, for example in special databases with real-time functions, where said data are stored for long-term storage at stipulated intervals of time. In particular, the historical process values comprise instances of limit values being exceeded and/or instances of limit values being undershot, which are usually linked to a timestamp.

The stored data are used, inter alia, to analyse accidents and incidents and also the process as an initial basis for improvements, for example for control loop tuning, for alarm management, for monitoring or inspection logs, what are known as audit trails, and for evidence about the observance of limit values for legal and environmental regulations.

The handling of the data stored in logs can be rendered more difficult by the fact that important information relating to the operational context is not incorporated. Often, it is unclear whether a reduction in the production volume can be attributed to a process problem or whether this was an intentional change of the production plan.

By way of example, a faulty pump with reduced capacity would be known to the operators of the installation. If this state is not input directly into the logging system of the installation, however, it is difficult at a later time to comprehend why there is a reduced capacity from the pump, which is indicated by appropriate reports, since the reason for the fall in capacity is incomprehensible. The fault in the pump, that is to say information relating to the operational context, is often no longer retrievable in the logs provided, even though it would be essential for particular analyses.

At the present time, operators use control or SCADA systems in order to manage industrial processes or a power supply system. In addition to this, it is desirable for them to work together with the servicing personnel, for example, who are located outside the control room. This cooperation often involves numerous telephone calls, the exchange of e-mails and exchange with superordinate systems, such as a computerized maintenance management system CMMS or an enterprise resource planning system (ERP), which manages the action planning for the resources that are existent in a company.

Often, important information is also written down as reminders on sticky notes or note paper, which can later be lost.

Many installation operators also avoid inputting texts into an available computer, such as an electronic shift book, since this often appears too time consuming.

SUMMARY

A logging system is disclosed for detecting, conditioning and presenting installation-specific and/or process-specific operator control actions, process reports, alarm reports, system events, installation parameters and digital text messages for a technical installation or a technical process having at least one input apparatus that automatically converts audible and/or spoken information and information that is present in written form into digital text messages and provides said information, together with information relating to operator control actions, information relating to navigation steps performed and further text information that is present in digitized form, for a processing unit, comprising: a processing unit for automatically attributing timestamps to digital text messages, information relating to operator control actions and navigation steps performed, or for linking said timestamps thereto; at least one search module provided in the processing unit for attributing an appropriate context, together with time series data, provided from at least one data archive, from process signals and alarm reports, system events and installation parameters, to particular events, and the digital text messages, operator control actions, process reports, alarm reports, system events; and a search module for retrieving installation parameters conditioned in this manner upon a complete search integrated in the search module, for presentation as an operating log or event log.

A method is also disclosed for detecting, conditioning and presenting installation-specific and/or process-specific operator control actions, process reports, alarm reports, system events, installation parameters and digital text messages for a technical installation or for a technical process, comprising: providing, from at least one input apparatus used to automatically convert audible and/or spoken information and information that is present in written form into digital text messages said information, together with information relating to operator control actions, information relating to navigation steps performed and further text information that is present in digitized form, to a processing unit; automatically attributing timestamps to the digital text messages, the information relating to operator control actions and the navigation steps performed, or linking aid timestamps thereto, in the processing unit; attributing via at least one search module provided in the processing unit an appropriate context, together with time series data from at least one data archive of process signals and alarm reports, system events and installation parameters, to particular events; and retrieving the digital text messages, operator control actions, process reports, alarm reports, system events and installation parameters conditioned in this manner using a complete search integrated in the search module for presentation as an operating log or event log.

BRIEF DESCRIPTION OF THE DRAWINGS

The invention and advantageous embodiments, improvements and further advantages of the invention will be explained and described in more detail with reference to the exemplary embodiments shown in the figures that follow, in which:

FIG. 2 shows an exemplary presentation that is provided by the inventive logging system on the screen of an operating and observation system.

DETAILED DESCRIPTION

Figure 1:
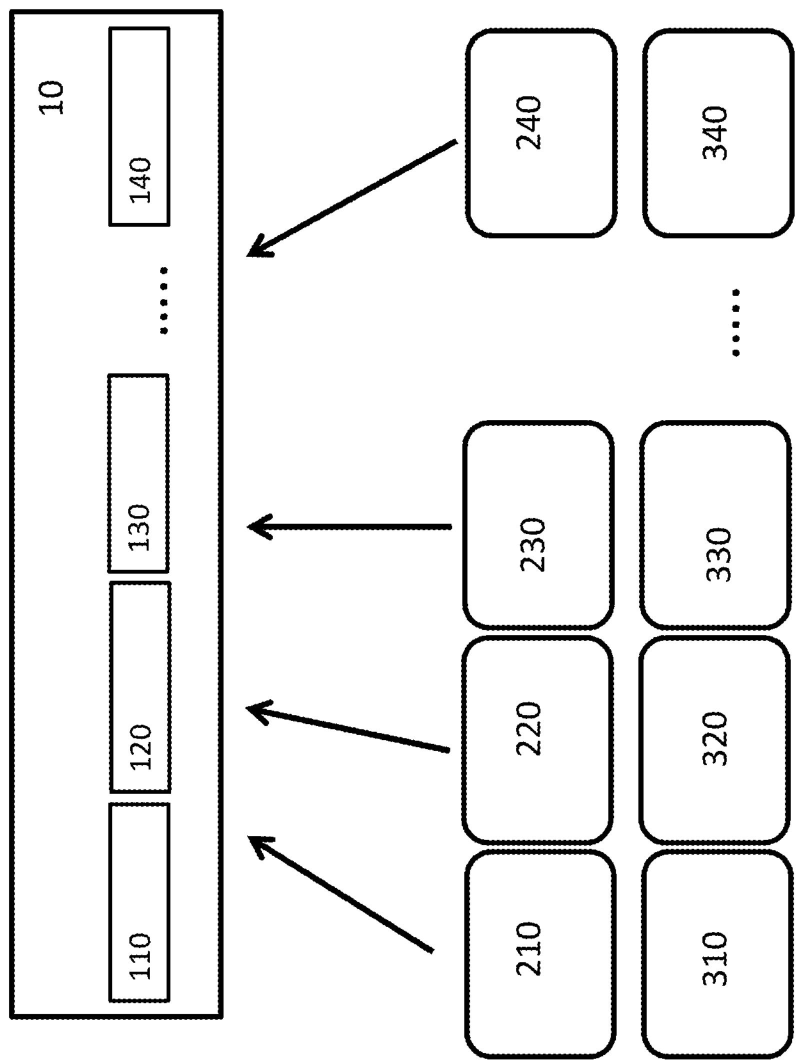
FIG. 1 shows an exemplary embodiment of the inventive logging system of an operating and observation system.

A system and a method are disclosed for detecting, conditioning and presenting information from alarm and/or event logs, such as installation-specific and/or process-specific operator control actions, process reports, alarm reports, system events, digital text messages and installation parameters, for a technical installation or a technical process that can, for example, be integrated in an operating and observation system of the commercial installation or the technical process, as a result of which the aforementioned disadvantages of the prior art are overcome.

An exemplary system and method for event logging are intended to store the relevant context information—which is desired for operating the installation or the process—relating to particular events in a standard, searchable logging system and to condition it such that it is possible to establish a relationship between operators in the control rooms of the installation or of the process and the capabilities of said operators to record and directly use all the information that arises during work situations.

Exemplary embodiments include means, such as a logging system, for detecting, conditioning and presenting installation-specific and/or process-specific information from alarm and/or event logs, such as installation-specific and/or process-specific operator control actions, process reports, alarm reports, system events, digital text messages and installation parameters, for a technical installation or a technical process. Advantageous embodiments and improvements of the inventive system and a corresponding method for detecting, conditioning and presenting installation-specific and/or process-specific operator control actions, process reports, alarm reports, system events, digital text messages and installation parameters for a technical installation or a technical process are also specified in further claims and in the description.

An exemplary logging system for detecting, conditioning and presenting installation-specific and/or process-specific operator control actions, process reports, alarm reports, system events, digital text messages and installation parameters for a technical installation or a technical process includes at least one input apparatus that automatically converts audible and/or spoken information and information that is present in written form into digital text messages and provides said information, together with information relating to operator control actions, information relating to navigation steps performed and further text information that is present in digitized form, which is stored in an SAP system, for example, for a processing unit.

By way of example, audible and/or spoken information may be information that is provided by a telephone or loudspeaker system. The information that is present in written form is, inter alia, handwritten notes and annotations that can be automatically converted into digital text messages, for example by means of a digital stylus. Examples of the text information that is already present in digitized form are e-mails and/or work orders and also service and revision records that are provided by superordinate systems, such as computerized maintenance management systems (CMMS), maintenance management systems (MMS) and/or enterprise resource planning systems (ERP).

By way of example, operator control actions can include actions on components of the installation or the process, such as the opening of a valve, and are for example, provided by a monitoring system of the installation or of the process.

The navigation steps detected in the logging system are for example, provided by a monitoring system (SCADA system) of the installation or of the process. The navigation steps include, inter alia, the opening of specific region or trend displays and are intended for the purpose of providing an appropriate context at a later time during analysis of the logged information or data, from which context it is possible to recognize that these region or trend displays were in focus for the operators of the installation or of the process.

The text messages, operator control actions, process reports, alarm reports, system events and/or installation parameters can be transmitted to the processing unit by means of appropriately attributed adapters, which include a speech adapter, for example, wherein the adapters advantageously automatically normalize, standardize and/or filter, on the basis of prescribable parameters, such as predefined keywords, the text messages that are present in digital form, the operator control actions, the process reports, the alarm reports, the system events and/or the installation parameters. By way of example, particular keywords could be defined that ensure that a notification is not logged. For example, if an operator says the keywords "interrupt recording", the conversation is not recorded and therefore is no longer available for further processing.

Adapters are pieces of software or software programs that evaluate a particular data source. To this end, the adapters work with different data sources but produce reports normalized in a standard manner that are available for further processing. This involves explicit assignment and normalization of the relevant digital text messages.

An effect advantageously achieved by virtue of the filtering of the text messages, operator control actions, process reports, alarm reports, system events and/or installation parameters being performed in advance is that otherwise too many worthless messages are stored in the logging system.

If, by way of example the adapter that handles the audible or audio signals identifies a short name for a signal (the official signal name could be "1LAB10FF901") while the operator calls it "high-pressure steam", the adapter can use a preconfigured table in order to identify the signal name and attribute it to the log entry. If a particular pump in the ERP system is managed under the designation "xyz", the adapter translates this designation into "P4711", for example. A search for "P4711" in the log therefore finds all mentions of the pump regardless of the system from which they originally come.

If it is later desirable to analyse an event with this signal, it can be assumed that the spoken message or piece of information is connected to this event, even if only the short name has been stated or spoken.

Since CMMS, ERP and MES systems often use their own syntax or their own name scheme for relevant information, data, events or signals, this information, these data, events or signals are then mapped in the adapter according to the standard name scheme of the logging system.

According to an exemplary embodiment, the processing unit integrated in the logging system is set up to automatically attribute timestamps to the digital text messages, the information relating to operator control actions and the navigation steps performed, or to link said timestamps thereto. For example, the digital text messages linked to the relevant timestamps comprise information about which person or which event has prompted the respective text message at which time and/or in which order.

At least one search module provided in the processing unit attributes an appropriate context, together with time series data—provided from at least one data archive—from process signals and alarm reports, system events and also installation parameters, to particular events, such as servicing or failure of an installation part to an initiated process report or alarm report.

This allows anomalies in time series to be explained by the context, and it is easier to interpret and evaluate the actions, reports, events, data and/or parameters from the installation or the process that are linked to the time series data.

According to exemplary embodiments, the conditioned digital text messages, operator control actions, process reports, alarm reports, system events and installation parameters can be retrieved using a complete search integrated in the search module and can be presented as an operating log or event log.

By way of example, a term "P4711", which describes a particular unit, such as a pump, is sought and all the information linked thereto, which includes audible and digital text messages, inter alia, that relates to this unit is filtered out or selected from the information stored in the SMS, ERP, CMMS, and DCS systems.

In one advantageous embodiment of the disclosed logging system, the digital text messages, operator control actions, process reports, alarm reports, system events and installation parameters that are conditioned in the operating log are dynamically customizable or updateable.

The method for detecting, conditioning and presenting installation-specific and/or process-specific operator control actions, process reports, alarm reports, system events, installation parameters and digital text messages for a technical installation or a technical process, which is furthermore used to achieve the object, involves at least one input apparatus being used to automatically convert audible and/or spoken information and information that is present in written form into digital text messages and to provide said information, together with information relating to operator control actions, information relating to navigation steps performed and further text information that is present in digitized form, for a processing unit.

According to an exemplary embodiment, timestamps are automatically attributed to the digital text messages, the information relating to operator control actions and the navigation steps performed, or said timestamps are linked thereto, in the processing unit, and at least one search module provided in the processing unit is used to attribute an appropriate context, together with time series data—provided from at least one data archive—from process signals and alarm reports, system events and installation parameters, to particular events.

For example, the data archive of a monitoring system or of a control system of the installation or of the process provides the information relating to operator control actions, process reports, alarm reports, system events and installation parameters that already has a timestamp for the detection apparatus.

The digital text messages, operator control actions, process reports, alarm reports, system events and installation parameters conditioned in this manner are retrieved using a complete search integrated in the search module and are presented as an operating or event log.

The system and method described herein, can enable the operators of the technical installation or of the technical process to record all the information that they encounter in their cooperatively oriented work situations, specifically by virtue of their creating logs and analysing various information sources that, like written information, such as notes and annotations, e-mails and work orders, which are provided by superordinate systems, include information relating to operator control actions and navigation steps/navigation actions.

The disclosed logging system and corresponding methods can advantageously be integrated into an operating and observation system for a commercial technical installation or process, such as an oil and gas platform, a refinery or a power station installation.

FIG. 1 shows an exemplary logging system for detecting, conditioning and presenting installation-specific and/or process-specific information for a commercial installation, such as operator control actions, process reports, alarm reports, system events, installation parameters and digital text messages. The logging system can include input apparatuses 310, 320, 330 . . . 340 for inputting or providing information relating to operator control actions, process reports, alarm reports, system events, installation parameters and/or digital text messages and also a processing unit 10, wherein the information can be transmitted from the input apparatuses 310, 320, 330 . . . 340 to the processing unit 10 by means of provided adapters 210, 220, 230 . . . 240.

The adapters 210, 220, 230 . . . 240 are intended to normalize, standardize and/or filter, on the basis of prescribable parameters, such as time periods and/or installation parameters, the text messages, operator control actions, process reports, alarm reports, system events and/or installation parameters before they are transmitted to the processing unit 10. An example of filtering would be not recording reports in particular installation states (installation shutdown or installation is being serviced) or for a period between 22:00 and 6:00 hours.

Thus, the processing unit 10 stores complete normalized classified or catalogued full-text-searchable log entries.

The input apparatuses 310, 320, 330 . . . 340 provided are a first input apparatus 310, which provides the audible and/or spoken information, for example from the control room of the installation, and/or information that is present in written form and automatically converts this information into digital text messages 140, and a second input apparatus 320, which provides information relating to further text information that is present in digitized form. The digital text messages that are present can be normalized, standardized and/or filtered, on the basis of prescribable parameters, and transmitted to the processing unit 10 by means of a first adapter 210 and a second adapter 220.

A third input apparatus 330 is intended to filter and/or to normalize, and to deliver to the processing unit 10, the text information that is already present in digitized form, which is provided by a maintenance, management and/or action planning system, using an appropriate third adapter 230.

The information relating to operator control actions, process reports, alarm reports, system events and installation parameters is provided by a fourth input or detection apparatus 340, for example, from a data archive of a monitoring system (SCADA system) or control system of the installation or of the process. This information is also filtered and/or normalized and transferred to the processing unit 10 using a further appropriate adapter 240.

The processing unit 10 automatically attributes timestamps 110 to the digital text messages 140, the information relating to operator control actions and the navigation steps that are performed, or links said timestamps thereto, using an integrated software module. A timestamp 110 is used to attribute an explicit time to an event, in this case an operator control action or a navigation step.

In addition, the processing unit 10 has an integrated search module that attributes an appropriate context to particular events from the digital text messages that are linked to the relevant timestamps 110 and from the process signals and alarm reports, system events and installation parameters that are provided and conditioned using the further adapter 240.

In this case, the context indicates which person or which event has prompted the respective text message at which time and/or in which order.

By way of example, the context may include a signal name 120, a region 130 and/or a digital text message 140 relating to a particular event (incident, quality problem, shutdown of a unit in the installation for servicing), which can be used to search, retrieve and/or present as an operating log or event log the conditioned digital text messages, operator control actions, process reports, alarm reports, system events and installation parameters using a complete search integrated in the search module.

By way of example, the complete search involves "P4711" being sought and everything that has happed with this pump being found, regardless of the telephone, SMS, ERP, CMMS and DCS systems in which statements relating to this pump are stored.

A further example can include the evaluation of an incident to the extent that first of all a repeated temperature rise has been registered in a sensor associated with the relevant unit before the unit fails. It is then subsequently possible for the relevant unit to be checked as early as after a first temperature increase in order to avoid the incident in future.

The correlation analyses known from the prior art can, for example, also be suitable for evaluating an incident.

FIG. 2 shows an exemplary presentation or view in table form that is provided by the disclosed logging system on the screen of an operating and observation system.

The first column 1 shows the timestamps 110 linked to the digital text messages.

The second column 2 shows which person 113 or which event prompted the respective text message 114, which is shown in the third column 3, at which time and/or in which order.

The next column 4 shows the information 130, 140, 113, 114 from the previous columns 1, 2 and 3, linked to a signal name 120.

The last column 5 shows events that have an associated relevant context for particular events. In this case, the context comprises a signal name 120 and a digital text message 140 relating to a particular event 115, which can be searched and retrieved using the complete search integrated in the search module.

According to the present disclosure, other forms of presentation such as flowcharts are also possible as an operating log.

For the purpose of storing information in the table shown in FIG. 2, it is possible to use the method that is described in WO 2009/112252, for example.

According to this method, the data or information provided by the input apparatuses 310, 320, 330 . . . 340 use a respective structure that comprises a plurality of attributes.

Accordingly, the table is used to store a first portion of the attributes associated with an alarm report or event report in normalized form.

Examples of attributes are the name of the acknowledging user, the name of the node at which an event (the event) was produced, the altered value before/after, the diagnosis code and/or the timestamp 110.

In addition to the cited normalized storage for the first portion of the attributes, both the first portion and a remaining second portion of the attributes are stored as a provision data record or as what is known as a flat fallback record. This can advantageously be accomplished in the language XML or in the form of BLOBs (Binary Large Objects) for example as a database column or as a separate file.

Flat fallback record denotes a memory location and the totality of the attributes stored there in (relatively) unstructured form. Although such a provision data record, for example stored in XML, is not or little suited to rapid queries, it is a complete data record that can be used for later analyses.

The normalized first portion of the attributes that is stored in the table can be used for display purposes. The first, directly stored portion of attributes allows very fast access. Exemplary attributes that should be available quickly are timestamp, tag name, event category or activation timestamp, for example. For later analyses, it is possible for the overall information stored as a provision data record (fallback record) to be made available again, for example by means of XML-processing devices of modern databases or by means of batch procedures.

Figure 3:
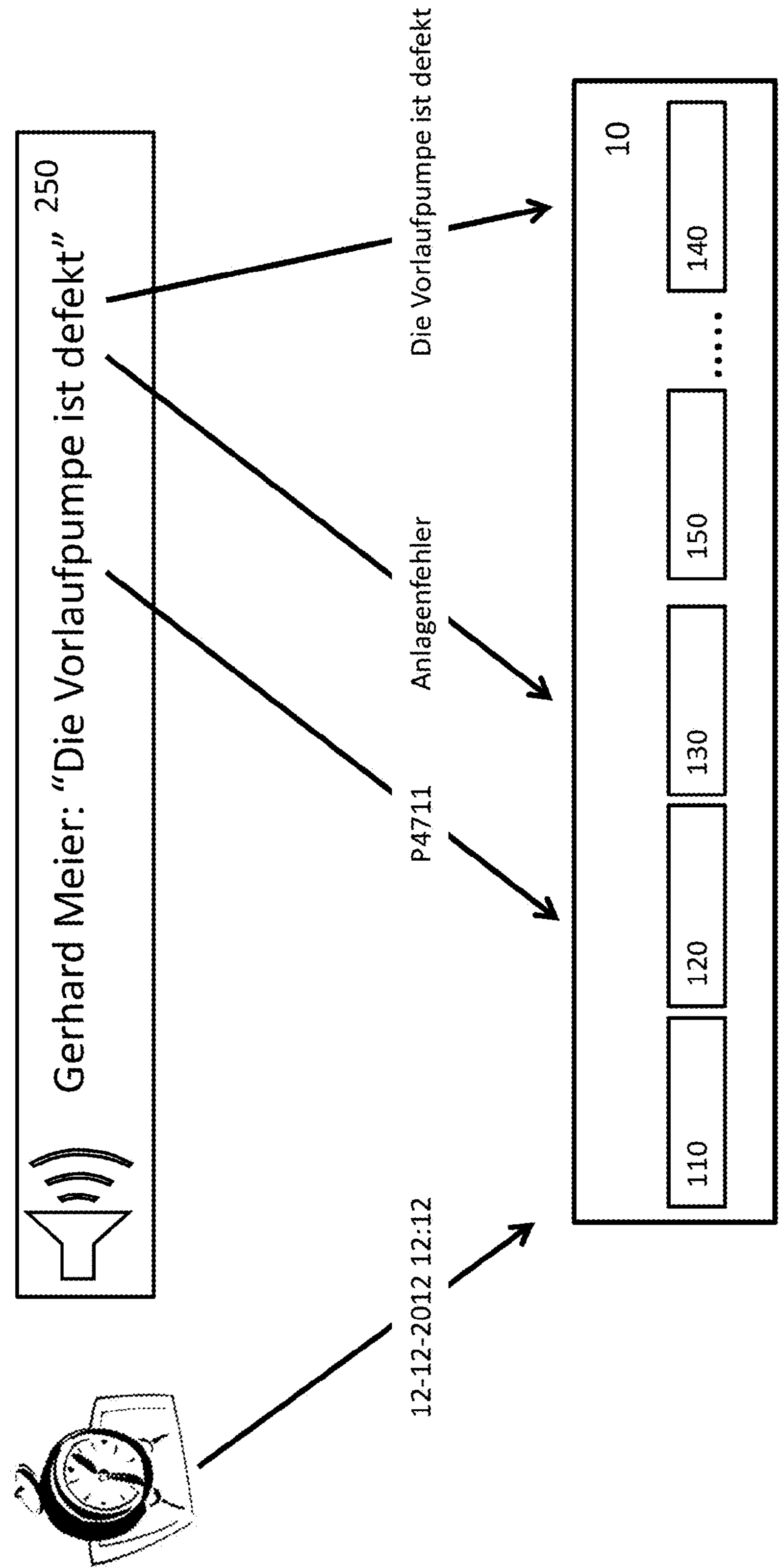
FIG. 3 shows an exemplary presentation for producing a log entry in the processing unit.

FIG. 3 shows an exemplary presentation for producing a normalized classified or catalogued full-text-searchable log entry in the processing unit 10 using a speech adapter 250.

The speech adapter 250 first of all recognizes a voice message and analyses this digitized raw message such that the term "flow pump" is automatically transmitted into the designation "P4711". The term "defective" is attributed to the category installation fault.

The message is then attributed to an operator or user 150 "Gerhard Meier" and a timestamp 110 is added.

It will therefore be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 First column
2 Second column
3 Third column
4 Fourth column
5 Fifth column

10 Processing unit
110 Timestamp
113 Information relating to persons or events
114 Text message
115 Event
120 Signal name
130 Region
140 Digital text message
150 User
210 First adapter
220 Second adapter
230 Third adapter
240 Further adapter
250 Speech adapter
310 First input apparatus
320 Second input apparatus
330 Third input apparatus
340 Fourth input apparatus

The invention claimed is:

1. A logging system for detecting, conditioning and presenting installation-specific and/or process-specific operator control actions, process reports, alarm reports, system events, installation parameters and digital text messages for a technical installation or a technical process having at least one input apparatus that automatically converts audible information and information that is present in written form into digital text messages and provides said information, together with information relating to operator control actions, information relating to navigation steps performed and further text information that is present in digitized form, for a processing unit, comprising:

- a processing unit for automatically attributing timestamps to digital text messages, information relating to operator control actions and navigation steps performed, or for linking said timestamps thereto;
- at least one search module provided in the processing unit for attributing an appropriate context, together with time series data, provided from at least one data archive, from process signals and alarm reports, system events and installation parameters, to particular events, and the digital text messages, operator control actions, process reports, alarm reports, system events; and
- a search module for retrieving installation parameters conditioned in this manner upon a complete search integrated in the search module, for presentation as an operating log or event log,
- wherein adapters for transmitting the text messages from the detection unit to the processing unit are forseen,
- wherein the adapters normalize, standardize and/or filter the text messages based on prescribable parameters, and
- wherein the adaptor that handles the audible signals is configured to identify a short name for a signal and to use a preconfigured table in order to identify the signal name and attribute it to the log entry.

2. The logging system according to claim 1, wherein the digital text messages linked to the relevant timestamps comprise:

- information about which person or which event has prompted a respective text message at which time and/or in which order.

3. The logging system according to claim 2, wherein the text information that is present in digitized form is handwritten notes and/or annotations, e-mails, work orders and/or service or revision records that are provided by superordinate systems of the installation or of the process.

4. The logging system according to claim 3, wherein the operator control actions comprise:

- actions to be performed on components of the installation or of the process.

5. The logging system according to claim 4, in combination with:

- the superordinate systems, which are computerized maintenance management systems (CMMS), maintenance management systems (MMS) and/or enterprise resource planning systems (ERP).

6. The logging system according to claim 1, wherein the text information that is present in digitized form is handwritten notes and/or annotations, e-mails, work orders and/or service or revision records that are provided by superordinate systems of the installation or of the process.

7. The logging system according to claim 6, in combination with:

- the superordinate systems, which are computerized maintenance management systems (CMMS), maintenance management systems (MMS) and/or enterprise resource planning systems (ERP).

8. The logging system according to claim 1, wherein the operator control actions comprise:

- actions to be performed on components of the installation or of the process.

9. The logging system according to claim 1, in combination with:

- a monitoring system of the installation for providing the operator control actions.

10. Logging system according to claim 1, wherein the navigation steps comprise:

- opening of specific region or trend displays.

11. The logging system according to claim 1, wherein the digital text messages, operator control actions, process reports, alarm reports, system events and installation parameters conditioned in the operating log are dynamically customizable or updateable.

12. The logging system according to claim 1, comprising:

- a data archive of a monitoring system or of a control system for the installation for providing information relating to operator control actions, process reports, alarm reports, system events and installation parameters for the detection apparatus.

13. The logging system according claim 1 in combination with:

- an operating and observation system for a technical installation in an oil or gas platform, for a refining or power station installation.

14. A method for detecting, conditioning and presenting installation-specific and/or process-specific operator control actions, process reports, alarm reports, system events, installation parameters and digital text messages for a technical installation or for a technical process, comprising:

- providing, from at least one input apparatus used to automatically convert audible and/or spoken information and information that is present in written form into digital text messages said information, together with information relating to operator control actions, relating to navigation steps performed and further text information that is present in digitized form, to a processing unit;
- automatically attributing timestamps to the digital text messages, the information relating to operator control actions and the navigation steps performed, or linking said timestamps thereto, in the processing unit;
- attributing via at least one search module provided in the processing unit an appropriate context, together with time series data from at least one data archive of process signals and alarm reports, system events and installation parameters, to particular events; and retrieving the digital text messages, operator control actions, process reports, alarm reports, system events and installation parameters conditioned in this manner using a complete search integrated in the search module for presentation as an operating log or event log;

transmitting the text messages from the detection unit to the processing unit are forseen, normalizing, standardizing and/or filtering, the text messages based on prescribable parameters; and identifying a short name for a signal and to use a preconfigured table in order to identify the signal name and attribute it to the log entry.

15. The method according to claim 14, comprising:

dynamically customizing or updating the digital text messages, operator control actions, process reports, alarm reports, system events and installation parameters conditioned in the operating log.

16. The method according to claim 14, comprising:

transmitting the text messages, operator control actions, process reports, alarm reports, system events and/or installation parameters from a detection unit via adapters.

17. The method according to claim 16, comprising:

normalizing, standardizing and/or filtering the text messages, operator control actions, process reports, alarm reports, system events and/or installation parameters based on prescribable parameters, in the adapters.

18. The method according to claim 14, wherein the installation is a technical installation in an oil or gas platform for a refinery or power station installation.

* * * * *